United States Patent [19]

Schrenk

[11] Patent Number: 4,712,177
[45] Date of Patent: Dec. 8, 1987

[54] CIRCUIT FOR A CORD CARRIER HAVING A MEMORY AND AN ACCESS CONTROL UNIT FOR SECURE DATA ACCESS

[75] Inventor: Hartmut Schrenk, Haar, Fed. Rep. of Germany

[73] Assignee: Siemens Aktiengesellschaft, Berlin and Munich, Fed. Rep. of Germany

[21] Appl. No.: 609,873

[22] Filed: May 14, 1984

[30] Foreign Application Priority Data

May 18, 1983 [DE] Fed. Rep. of Germany ....... 3318083

[51] Int. Cl.⁴ .............................................. G06F 11/34
[52] U.S. Cl. ................................. 364/200; 235/380; 235/474
[58] Field of Search ... 364/200 MS File, 900 MS File; 235/380, 382, 382.5

[56] References Cited

U.S. PATENT DOCUMENTS

| 4,087,856 | 5/1978 | Attanasio | 364/200 |
|---|---|---|---|
| 4,092,524 | 5/1978 | Moreno | 235/419 |
| 4,211,919 | 7/1980 | Ugon | 235/488 |
| 4,271,482 | 6/1981 | Giraud | 364/900 |
| 4,295,041 | 10/1981 | Ugon | 235/488 |
| 4,408,203 | 10/1983 | Campbell | 235/382 |
| 4,435,752 | 5/1984 | Winkelman | 364/200 |
| 4,442,345 | 4/1984 | Mollier | 235/382.5 |
| 4,498,075 | 2/1985 | Gaudio | 340/825.17 |
| 4,499,556 | 2/1985 | Halpern | 364/900 |
| 4,534,018 | 8/1985 | Eckert | 364/900 |
| 4,628,195 | 12/1986 | Baus | 235/747 |

FOREIGN PATENT DOCUMENTS

| 2311360 | 12/1976 | France . |
|---|---|---|
| 2401459 | 3/1979 | France . |
| 2471004 | 6/1981 | France . |
| 8102480 | 9/1981 | PCT Int'l Appl. . |

Primary Examiner—Archie E. Williams, Jr.
Assistant Examiner—Emily Y. Chan
Attorney, Agent, or Firm—Herbert L. Lerner; Laurence A. Greenberg

[57] ABSTRACT

A monolithically integrable circuit includes a memory having electrically writable and erasable non-volatile storage cells and a memory region having an addressing space subdivided into a plurality of partial quantities of respective addresses receiving reference data, an addressing circuit connected to the memory for reading out, writing and erasing partial regions of the memory, a control unit connected to the memory and to the addressing circuit causing access to part of the memory addresses to be dependent on an input operation through the addressing circuit, the control unit including a data comparison unit carrying out comparison operations between a plurality of stored reference data and externally entered code data, address lines connected to the memory, a selection logic connected to the address lines for determining the partial quantities together with the address lines, and an address control unit connected to the address lines through the selection logic for delivering a release signal if at least one address was selected from each partial quantity during the comparison operations.

17 Claims, 9 Drawing Figures

FIG 5

|    | B1  | B2  | B3  | B4  | B5  | B6  | B7  | B8  |
|----|-----|-----|-----|-----|-----|-----|-----|-----|
| Z7 | S48 |     |     |     |     |     |     |     |
| Z6 | S40 | S41 | S42 | S43 | S44 | S45 | S46 | S47 |
| Z5 | S32 | S33 | S34 | S35 | S36 | S37 | S38 | S39 |
| Z4 | S24 | S25 | S26 | S27 | S28 | S29 | S30 | S31 |
| Z3 | S16 | S17 | S18 | S19 | S20 | S21 | S22 | S23 |
| Z2 | S8  | S9  | S10 | S11 | S12 | S13 | S14 | S15 |
| Z1 | S0  | S1  | S2  | S3  | S4  | S5  | S6  | S7  |

FIG.6a

|    | B1 | B2 | B3 | B4 | B5 | B6 | B7 | B8 |
|----|----|----|----|----|----|----|----|----|
| Z7 |    |    |    |    |    |    |    |    |
| Z6 |    |    |    |    |    |    |    |    |
| Z5 |    |    |    |    |    |    |    |    |
| Z4 |    | V2 | V3 |    |    |    |    |    |
| Z3 |    |    |    | V4 |    |    |    | V8 |
| Z2 | V1 |    |    |    | V5 |    |    |    |
| Z1 |    |    |    |    |    | V6 | V7 |    |

FIG.6b

|    | B1 | B2 | B3 | B4 | B5 | B6 | B7 | B8 |
|----|----|----|----|----|----|----|----|----|
| Z7 |    |    |    |    |    |    |    |    |
| Z6 |    |    |    |    |    |    |    |    |
| Z5 |    |    |    |    |    | V5 |    |    |
| Z4 |    | V2 | V3 |    |    |    |    |    |
| Z3 |    |    |    | V4 |    |    |    | V8 |
| Z2 | V1 |    |    |    |    |    |    |    |
| Z1 |    |    |    |    |    |    | V6 | V7 |

FIG.6c

|    | B1 | B2 | B3 | B4 | B5 | B6 | B7 | B8 |
|----|----|----|----|----|----|----|----|----|
| Z7 |    |    |    |    |    |    |    |    |
| Z6 |    |    |    |    |    |    |    |    |
| Z5 |    |    |    |    |    |    |    |    |
| Z4 |    | V2 | V3 |    |    |    |    |    |
| Z3 |    |    |    | V7 |    |    |    | V6 |
| Z2 | V1 |    |    |    | V8 |    |    |    |
| Z1 |    |    |    |    |    | V4 | V5 |    |

FIG.6d

|    | B1 | B2  | B3  | B4  | B5  | B6  | B7  | B8  |
|----|----|-----|-----|-----|-----|-----|-----|-----|
| Z7 |    |     |     |     |     |     |     |     |
| Z6 |    |     |     |     |     |     |     | V5  |
| Z5 |    | V4  | V6  | V12 | V11 |     |     |     |
| Z4 | V2 | V3  |     |     |     | V13 |     |     |
| Z3 |    |     | V7  |     |     |     |     |     |
| Z2 | V1 |     | V8  | V9  | V10 |     | V14 | V15 |
| Z1 |    |     |     |     |     |     |     |     |

CIRCUIT FOR A CORD CARRIER HAVING A MEMORY AND AN ACCESS CONTROL UNIT FOR SECURE DATA ACCESS

BACKGROUND OF THE INVENTION

The invention relates to a monolithically integrable circuit configuration including a memory with non-volatile, electrically writable and erasable storage cells, an addressing circuit for reading out, writing and erasing partial regions of the memory, and a control unit, which causes access to part of the memory addresses through the addressing circuit to be dependent on an input operation with data comparison between stored reference data and code data entered from outside.

Data-controlled payment systems are known for the cashless payment for merchandise or for the accounting of services and the like Such systems are described, for instance, in the journal "Betriebspraxis", B.BL.2/1982, Page 48, by Dr. R. Nowak and W. Röder under the title "Die Chip-Karte - nächste Generation der Automatenkarte" (The Chip Card—Next Generation of the Automation Card). The cards used in such a case carry an essential element which is a non-volatile electric data memory that can be accessed through electric contacts on the surface of the card. During each use, an arithmetic unit accesses the memory content which is optionally changed in the process, through a card reader.

Such cards are used in security and access systems, in accounting or recording systems and in debit or credit systems. In order to assure a wide distribution and frequent use of the cards, operators of such systems issue a large number of cards and offer an extensive network of readers and computer systems. In order to preclude misuse of the data, the card systems must meet stringent security requirements. It is especially important to protect the carrier cards against use by unauthorized persons, since the distribution thereof is not always controllable.

This can be achieved by a release or validation operation, wherein a comparison of data takes place between a code word which is entered by an operator or is encoded by a computer, and a stored reference word, and the access is released or prevented, depending on the result of the comparison.

In this connection, however, the danger exists that an unauthorized person might procure the secret information required for the release or validation by systematic trial or by listening to the data traffic during the release operation.

The main differences between the known control measures are in the execution of the release operation and in the wiring or the means required therefor.

French Patent FR-PS No. 23 11 360 discloses a manner of providing a certain number of code entries by an operator and of storing all non-permissible attempts in a memory provided for this purpose, so often that the entire memory space is occupied, in order to determine an access authorization. The unit to be protected is thus taken out of operation. In this connection, French Patent FR-PS No. 24 01 459 further describes a data memory which is subdivided by different access conditions, into a secret, externally non-accessible memory region and into two further memory regions which can only be written or read externally.

A further control unit is disclosed in Published PCT International Application No. WO 81/02480. The control unit operates in such a way that the actual address of the memory to be protected is formed by a linkage of the memory address to be entered externally with data words from an internal auxiliary memory in a feedback arrangement.

Finally, a circuit with a memory and a control unit is known from French Patent FR-PS No. 24 71 004, in which the connection between the addressing unit and the address decoder of the memory is interrupted, in case of a non-permissible access.

It is accordingly an object of the invention to provide a circuit with a memory and an access control unit, which overcomes the here-inafore-mentioned disadvantages of the heretofore-known devices of this general type with which a release operation can be carried out, that increases the difficulty of unauthorized decoding of the secret data required therefor.

SUMMARY OF THE INVENTION

With the foregoing and other objects in view there is provided, in accordance with the invention, a monolithically integrable circuit, comprising a memory having electrically writable and erasable non-volatile storage cells and a memory region having an addressing space subdivided into a plurality of first partial quantities of a plurality of respective addresses receiving reference data, an addressing circuit connected to the memory for reading out, writing and erasing partial regions of the memory, a control unit connected to the memory and to the addressing circuit causing access to part of the memory addresses to be dependent on an input operation through the addressing circuit, the control unit including a data comparison unit carrying out comparison operations between a plurality of stored reference data and externally entered code data, address lines connected to the memory, a first selection logic connected to the address lines for determining the first partial quantities together with the address lines, and an address control unit connected to the address lines through the selection logic for delivering a first release or validation signal if at least one address was selected from each first partial quantity during the comparison operations.

Since the supply of reference data stored in the memory is larger than the amount of reference data required during an operation, this additionally stored information can serve to vary and recode the data transfer from the arithmetic unit to the circuit during the release or validation operation. The data traffic is therefore difficult to decode for a non-authorized listener.

The incidental or forbidden knowledge of a set of code data which are necessary for a release or validation operation, is not sufficient to enable an imposter to change the respective reference data in the memory in such a way that the forbidden access can be repeated. It is similarly impossible to use home made circuits or memories with fraudulent intent.

In accordance with another feature of the invention, the address control unit includes a plurality of multivibrators being addressable by the addresses of the first partial quantity, and an AND logic controlling output signals of the address control unit.

In accordance with a further feature of the invention, the address control unit includes a counting chain for checking a predetermined time sequence of the selection of said addresses of the first partial quantities.

In accordance with an added feature of the invention, there is provided an error or fault register connected to an output of the control unit, the error register being set if agreement has not been reached between the sored reference data and the entered code data.

In accordance with an additional feature of the invention, there is provided a logic unit having an input side connected to outputs of the error or fault register and the address control unit for delivering another release or validation signal.

In accordance with again another feature of the invention, there is provided another selection logic connected to the address control unit for determining other or second partial quantities of address lines as the quantity of intersections with the first-mentioned partial quantities.

In accordance with again a further feature of the invention, there is provided another selection logic connected to the address control unit for determining other or second partial quantities of address lines as the quantity of intersections with the first-mentioned partial quantities, and another logic unit connected between the selection logics and the address control unit for blocking the connection of the first-mentioned selection logic to the address control unit when addresses outside the other partial quantities are selected.

In accordance with again an added feature of the invention, the code memory addresses of the other partial quantities cannot be read out.

In accordance with again an additional feature of the invention, the code memory addresses can be erased and/or written.

In accordance with yet another feature of the invention, the data comparison unit is an integrated comparison unit.

In accordance with yet a further feature of the invention, there is provided another selection logic connected to the address control unit for determining other or second partial quantities of address lines as the quantity of intersections with the first-mentioned partial quantities, a data comparison with setting of the error or fault register also being able to be carried out for addresses outside the other or second partial quantities.

In accordance with a concomitant feature of the invention, there is provided a counting and inhibition logic for limiting the number of possible release operations.

Other features which are considered as characteristic for the invention are set forth in the appended claims.

Although the invention is illustrated and described herein as embodied in a circuit with a memory and an access control unit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIGS. 5 and 6a, b, c and d are tables showing an application example of the circuit configuration according to FIG. 2 or FIG. 3.

DESCRIPTION OF THE PREFERRED EMBODIMENT

Figure 1:
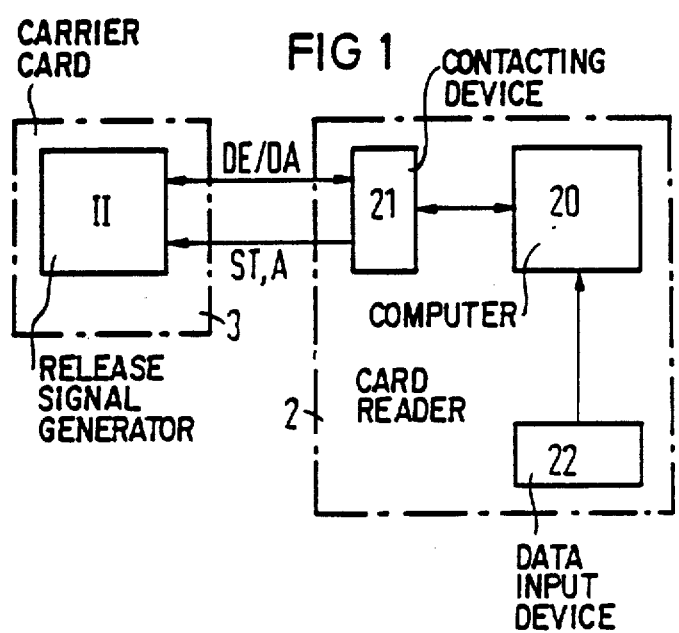
FIG. 1 is a block circuit diagram of a system for data exchange between a carrier card and a computer.
Figure 2:
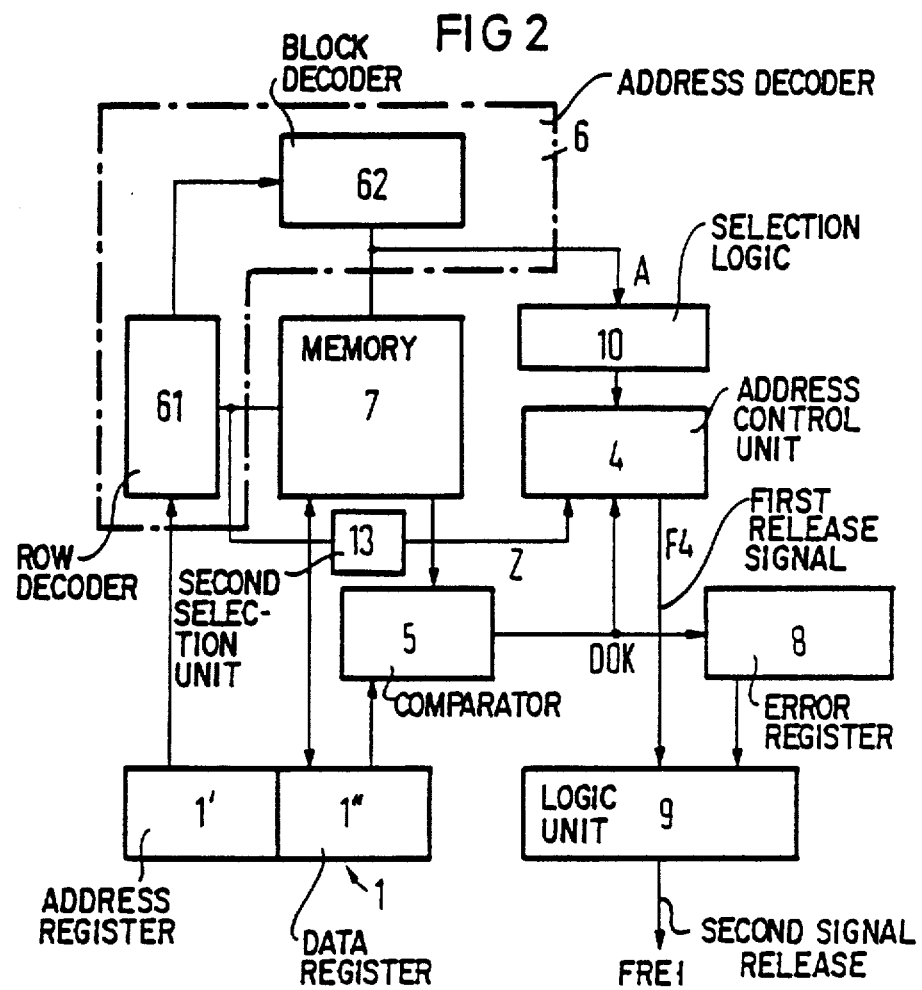
FIG. 2 is a block circuit diagram of a circuit configuration with a memory and an access control unit.
Figure 3:
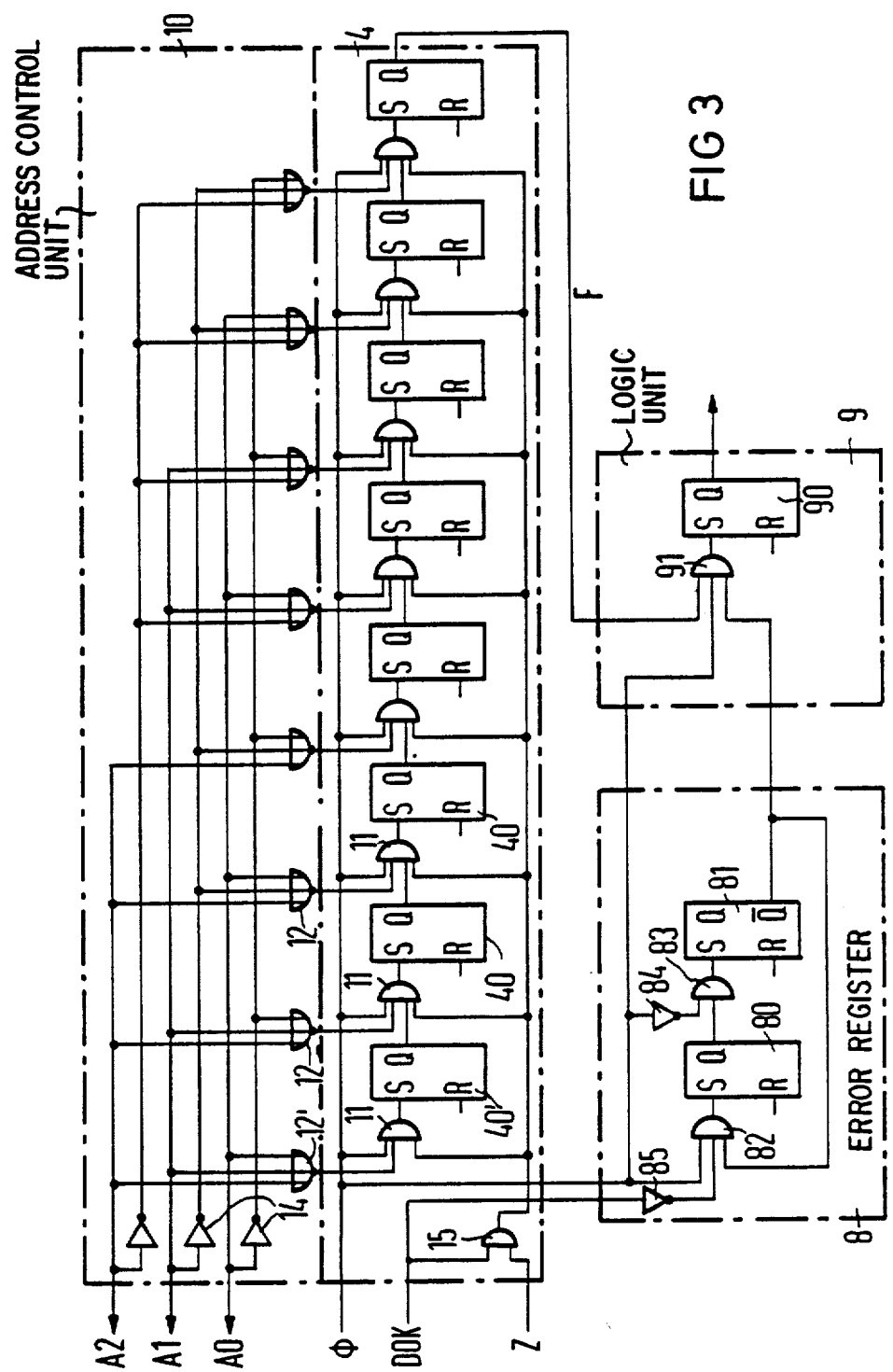
FIGS. 3 and 4 are schematic and block circuit diagrams showing details of the circuit configuration according to FIG. 2.

Referring now to the figures of the drawings in detail and first particularly to FIG. 1 thereof, there is seen a circuit configuration II which is disclosed in detail in FIGS. 2 and 3. The circuit II is in functional connection with other operating units and it is embedded in a carrier card 3. By inserting the carrier card 3 into a card receptacle of a card reader 2, a data exchange over data input/data output lines DE/DA to a computer 20 can take place through a contacting device 21. Such carrier cards 3 can be employed, for instance, as credit or debit cards. Card readers 2 may be used as automatic tellers. Furthermore, such circuits II are also suitable in card form for use in access-secured installations, without a carrier medium.

Unlimited data exchange, for instance in order to effect the payment of money, only takes place if a release signal has been generated by the circuit configuration II. This condition exists after a successful release operation. To the extent that this is necessary for the use of the card, the user enters one or several individual code words into the computer 20 through a data input unit 22, for passing it on to the circuit II. During the release operation, the data exchange is limited to the extent that only the operations required for the test can be carried out. Among these operations are the delivery of control and address signals through lines ST, A to the circuit configuration II.

FIG. 2 is a block circuit diagram for the circuit configuration II which generates a release or validation signal FREI. The circuit includes a register 1 having an address register 1' and data register 1''. The data register 1'' serves for receiving code data, whereas a bit sequence in the data address register 1' addresses the storage location of reference data in a memory 7 through an address decoder 6.

A comparator 5 for carrying out comparison operations between a plurality of code data and reference data is connected between the memory 7 and the data register 1''. The comparison operations can be carried out sequentially or simultaneously in this case. If agreement between code data and reference data is ascertained in a comparison operation, the comparator unit 5 always delivers a comparison signal DOK to an address control unit 4. In the event of an inequality, an error register 8 is addressed by the inverted comparison signal DOK.

The memory 7 includes non-volatile, electrically writable and erasable storage cells which can be addressed row-wise and column-wise. Several storage cells can be selected under one address, depending on the length of the code and reference data.

The storage space on the memory 7 can be addressed by a row decoder 61 and a block decoder 62. The block decoder 62 therefore defines a first partial quantity of addresses within the addressing space. Address lines A corresponding to these first partial quantities are connected to the address control unit 4 through a first selection logic 10. The function of the selection logic 10 can also be taken over by the block decoder.

Address lines leading from the row decoder 61 to the memory 7 are also connected through a further or second selection unit 13 to the address control unit 4. The address space of the memory 7 can be subdivided into second partial regions, which intersect with the block subdivision via this second partial quantity. In this manner, the memory operation can be subdivided, such as into a user data memory and a code data memory, which in turn are subdivided into blocks.

In this case the code data region can serve for receiving the reference data. The memory content of this region can therefore not be read out through the register 1. Depending on the application, an access to the user memory, such as for describing or erasing it, can only be carried out after a successful comparison operation, at the end of which the second release signal FREI must be generated.

Information as to which first and second partial quantities of the address lines must be selected during a release operation is impressed on the circuit II through the address control unit 4 and the selection logic 13. If at least one address for a data comparison has been selected in the course of a release operation in each of the first partial quantities of address lines, and/or the addressing takes place additionally in a predetermined order, then a first release signal F can be taken off at the addressing control unit 4; this signal can be fed to a logic unit 9 together with the output signal of the error register 8.

Independently of the operation described above, an error (or fault) register 8 is set for every comparison which results in a deviation between the reference data word and the code word.

If the access conditions to the address space of the memory 7 are met and if agreement between all of the code data and reference data has been ascertained through the comparison unit 5, then the logic unit 9 generates the second release signal FREI.

The second release signal FREI can be linked with control signals which cause reading, writing or erasing of the user data region in a non-illustrated access protection device.

Referring to the remaining figures of the drawings, it is noted that the first partial quantity of address lines is determined by 8 blocks, each having a larger number of storage locations that are eight bits long. The addressing is accomplished in this case by the three least significant bits of the address word which can be taken off at address lines A0, A1, A2.

On one hand, the address lines for the first four rows, and on the other hand, the address lines for the remaining rows of the memory 7, belong to the second partial quantities of address lines. In this case, the first four rows belong to the code data region, and the remaining rows belong to the user data region. If one of the address lines of the code data region is activated, this state is indicated by the second selection logic 13 on a line Z.

The address control unit 4 may be constructed with the first selection logic 10 in such a way that an order of the block addressing in time is fixed. This order permits the eight blocks to be selected sequentially in increasing order. Furthermore, it has been determined by way of example that only the first access to each block is effective for counting. In addition, reference data which are stored in the user data region are optionally to be included in the data comparison; however, access to the user data region should not influence the address control unit 4.

Corresponding to the eight blocks, the address control unit 4 in FIG. 3 includes a counting chain of eight bistable multivibrators 40, having setting inputs which are respectively connected through a second logic unit formed of AND gates 11, to outputs of the first and second selection logics 10, 13. The setting inputs S of the multivibrators 40 are respectively connected through the AND gate 11 to the output of a corresponding NOR gate 12, to a clock signal $\phi$ and through an AND gate 15 to the output of the selection logic 13 and the comparison signal DOK.

Figure 4:
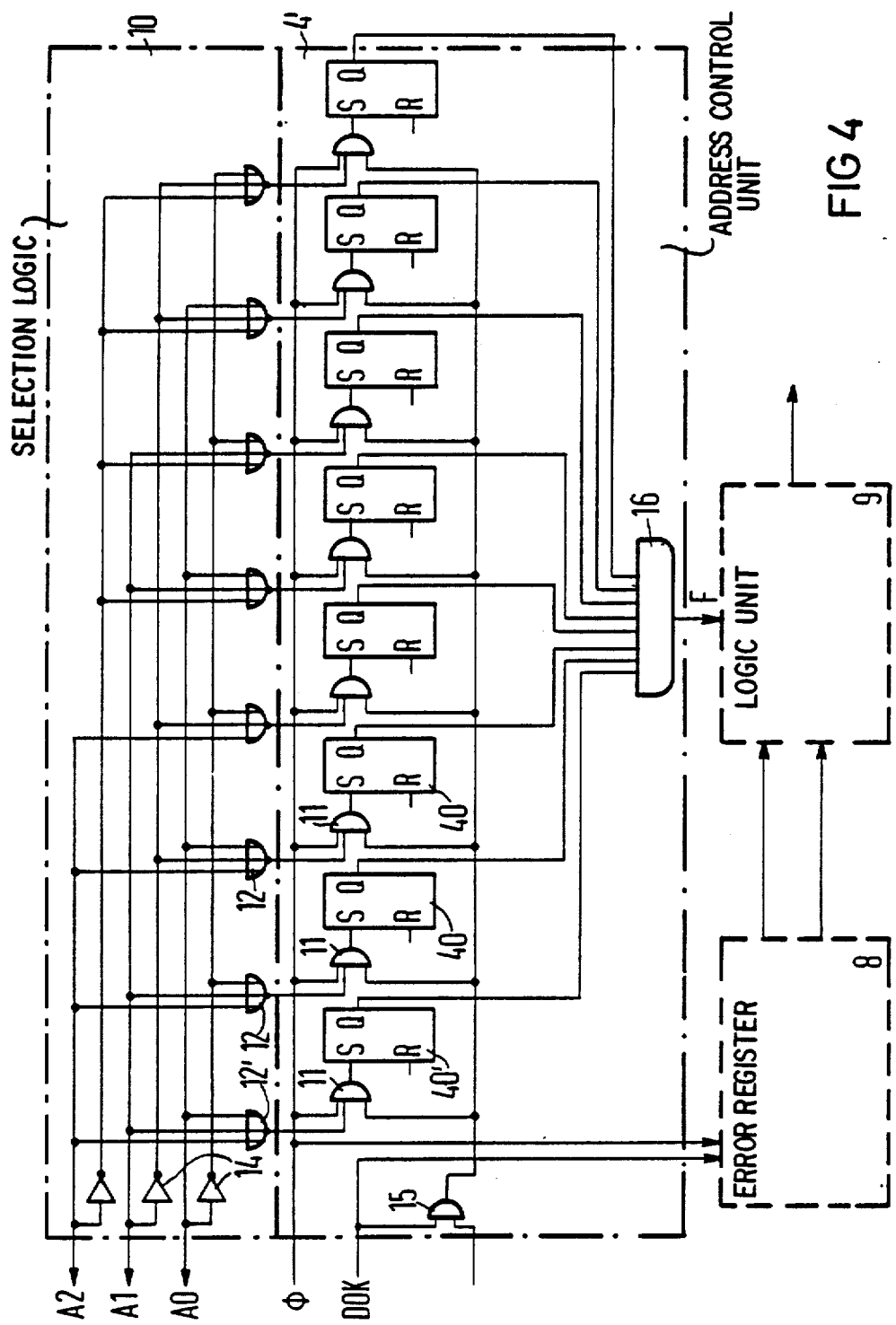

FIG. 4 shows an addressing logic 4' in which the outputs Q of all of the multivibrators 40 are fed to an AND gate 16, having an output delivering the first release signal F. The structure of this embodiment of the addressing logic 4' is based on an access condition, which is that in the course of the comparison operation, each of the blocks determined by the address lines A0, A1, A2 is addressed at least once in order to generate the first release signal F. The order of block addressings has no influence on the generation of the second release signal FREI in this embodiment.

As seen in FIG. 3, the error register 8 includes two series-connected bistable multivibrators 80, 81. The setting input S of the first multivibrator is connected in this case through an AND gate 82 to the output $\overline{Q}$ of the second bistable multivibrator 81 and to the output of the comparison unit 5 delivering the signal DOK, through an inverter 85. All of the bistable multivibrators of the address control unit 4 and of the error register 8 are set when a setting clock signal $\phi$ is present, with the exception of the second bistable multivibrator 81 of the error register 8 which is set if the setting clock signal $\phi$ does not occur, because of an inverter 84. The error register 8 is set if the comparison signal DOK is not activated during the occurence of a setting clock signal $\phi$. The error result is transferred to the output during the time in which the setting clock signal has the logical value 0. The logic unit 9 also includes a bistable multivibrator 90, having a setting input S which is connected through an AND gate 91 to the output Q of the last multivibrator 40 of the counting chain of the address control unit 4 and to the output $\overline{Q}$ of the second multivibrator 81 of the error register 8. If the bistable multivibrator 90 of the logic unit 9 is set, the release signal FREI can be taken off at the output Q thereof.

Since according to the invention, the blocks are selected in this embodiment through the three least significant address bits, the three address lines A0, A1, A2 and any lines parallel thereto are connected to the NOR gates 12 through series-connected inverters 14, in such a way that the NOR gate 12' which is connected in series with the first multivibrator 40' has the logical output level 1 if the address of a first block B1 shown in FIGS. 5 and 6, is applied.

By connecting the address of the second block B2, only the NOR gate connected in series with the second multivibrator 40 has an output level of logical 1, etc.

The counting chain is therefore advanced only if the bistable multivibrators 40 are sequentially set in increasing order.

FIG. 5 gives the addressing scheme for the above-described first embodiment for the memory 7. The memory locations are determined by rows and blocks, wherein the lower four rows Z1 to Z4 are assigned to the code data region and the remaining rows are assigned to the user data region. All of the memory locations are numbered sequentially. In this case the code data region includes the memory locations S0 to S31. The remaining memory locations S32 to S48 and those following belong to the user region. The first respective memory locations of each row are assigned to a first block B1 and the second respective memory locations of all of the rows are assigned to a second block B2, etc. The blocks B1 to B8 correspond to the first partial quantities of the address space of the memory 7. The row address lines correspond to the second partial quantities of the address space.

In the memory accesses described below, at least eight comparison operations are carried out successively starting with the eight blocks B1 to B8 shown by way of example. The memory locations selected in this case are designated with reference symbols V1 to V15, which indicate the order in time of the accesses. It is assumed here that there is agreement in each comparison operation between the code data and the reference data, which results in each comparison operation in the delivery of the comparison signal DOK. The error register 8 is therefore not set in any event.

As described above, the second release signal FREI is only generated if the following conditions are met simultaneously: All of the blocks B1 to B8 must be traversed in increasing order with respect to the code data region. The error register 8 must not be set in this case. Further addresses from the code data or user data region can be included without influence on the address control unit 4 in the data comparisons of a release operation. However, the reference data stored there have an influence on the result of the error register 8 through the comparison unit 5.

In FIG. 6a, the addresses of the storage locations S8, S25, S26, S19, S12, S5, S6 and S23 are selected sequentially. This addressing results in the issuance of the second release signal FREI, since at least one address per block was selected and the required order was observed.

In the following example illustrated in FIG. 6b, the addresses of the memory locations S8, S26, S27, S20, S35, S6, S7 and S23 are selected sequentially. However, since there is no access to the block B2, and the address of the memory locations S35 in the block B5 is outside the code data region, the address control unit 4 does not generate the first release signal F. There is accordingly no release of the memory access.

In the example of FIG. 6c, there is likewise no release, since the order of the selection deviates from the required order. This is because when the addresses of the storage locations S8, S26, S25, S5, S6, S23, S19 and S12 are applied, the memory location S26 in the block B3 is selected ahead of the memory location S25 in the block B2.

In FIG. 6d, all of the conditions for a release are again observed. Sequentially, the addresses of the storage locations S8, S24, S33, S47, S34, S18, S10, S11, S12, S36, S35, S29, S14 and S15 are selected. In each block B1 to B8, at least one storage location of the code data region is addressed. In addition, an increasing order of the respective first block selection in the code data region is provided. Access was made to the sorage locations S8, S25, S18, S11, S12, S29, S14 and S15 with a permissible order.

Through the use of the circuit according to FIG. 4, in which only the completeness of the selected addresses is of importance in the data comparison but not the order of the selection, even an access sequence according to FIG. 6c leads to the generation of the release signal FREI.

In one further embodiment of the invention, the circuit includes a read block which prevents memory addresses of the code data region from being read out. A counting device through which the number of release operations can be counted, is also provided. If a predetermined number of release operations is exceeded, such as because an attempt is made to determine an unauthorized code word by repeated input of data words, all further access to the memory is blocked by a further blocking device. Further details of the read inhibitor, the counting device and the further inhibitor may be seen from co-pending Application Serial No. 609,783, filed May 14, 1984, U.S. Pat. No. 4,572,946 having the same inventor.

Through the use of the circuit configuration according to the invention, a large number of different row addresses can be combined with the respective block addresses for generating a release signal FREI. The large number of secret reference data available in the memory makes it possible to simply recognize falsifications with incorrect reference data through unsuccessful release attempts. The security against fraud is particularly high if the number of permissible release attempts is also limited through the construction of the control logic.

I claim:

1. Monolithic circuit disposed in a carrier card, being in cooperative engagement with a card reader having a validation data input, comprising a memory having electrically writable and erasable non-volatile storage cells and a memory region having an addressing space subdivided into a plurality of partial quantities of respective addresses receiving reference data, an addressing circuit connected to said memory for reading out, writing and erasing partial regions of said memory, a control unit connected to said memory and to said addressing circuit causing access to part of the memory addresses to be dependent on an input operation through said addressing circuit, said control unit including a data comparison unit carrying out comparison operations between a plurality of stored reference data and externally entered code data, an error register connected to said comparison unit for storing an error if non-agreement is determined between said stored reference data and said externally entered code data, address lines connected to said memory, a selection logic connected to said address lines for determining, according to a predetermined order, said partial quantitites together with said address lines, and an address control unit connected to said address lines through said selection logic for delivering a first release signal for confirming the validity of said validation data if at least one address was selected from each partial quantity during said comparison operations, and a logic unit connected to said error register and said address control unit for generating a second release signal in response to said first release signal and no error being stored in said error register.

2. Circuit according to claim 1, wherein said address control unit includes a plurality of multivibrators being addressable by said addresses of said partial quantity, and an AND logic controlling output signals of said address control unit.

3. Circuit according to claim 1, wherein said address control unit includes a counting chain for checking a predetermined time sequence of the selection of said addresses of said partial quantities.

4. Circuit according to claim 1, wherein the memory includes code data in code addresses which can be erased.

5. Circuit according to claim 1, wherein the memory includes code data in code addresses which can be written.

6. Circuit according to claim 1, wherein the memory includes code data in code addresses which can be erased and written.

7. Circuit according to claim 1, wherein said data comparison unit is an integrated circuit.

8. Circuit according to claim 1, further having a counting and inhibition logic included in the address control unit for limiting the number of release operations.

9. Monolithic circuit disposed in a carrier card, being in cooperative engagement with a card reader having a validation data input, comprising a memory having electrically writable and erasable non-volatile storage cells and a memory region having an addressing space subdivided into a plurality of partial quantities of respective addresses receiving reference data, an addressing circuit connected to said memory for reading out, writing and erasing partial regions of said memory, a control unit connected to said memory and to said addressing circuit causing access to part of the memory addresses to be dependent on an input operation through said addressing circuit, said control unit including a data comparison unit carrying out comparison operations between a plurality of stored reference data and externally entered code data, an error register connected to said comparison unit for storing an error if non-agreement is determined between said stored reference data and said externally entered code data, address lines connected to said memory, a selection logic connected to said address flines for determining, according to a predetermined order, said partial quantities together with said address lines, an address cotnrol unit connected to said address lines through said selection logic for delivering a release signal to said card reader for confirming the validity of said validation data if at least one address was selected from each partial quantity during said comparison operations, the error register being connected to an output of said control unit, said error register being set if agreement has not been reached between said stored reference data and said entered code data for inhibiting said release signal.

10. Circuit according to claim 9, including a logic unit having an input side connected to outputs of said error register and said address control unit for delivering another release signal.

11. Circuit according to claim 10, including another selection logic connected to said address control unit for determining other partial quantities of address lines as the quantity of intersections with said first-mentioned partial quantities, and another logic unit connected between said selection logics and said address control unit for blocking the connection of said first-mentioned selection logic to said address control unit when addresses outside said other partial quantities are selected.

12. Circuit according to claim 9, including another selection logic operatively engaging said address control unit for determining other partial quantities of address lines as the quantity of intersections with said first-mentioned partial quantities, the data comparison unit serving for setting said error register for addresses including said other partial quantities.

13. Monolithic circuit disposed in a carrier card, being in cooperative engagement with a card reader having a validation data input, comprising a memory having electrically writable and erasable non-volatile storage cells and a memory region having an addressing space subdivided into a plurality of partial quantities of respective addresses receiving reference data, an addressing circuit connected to said memory for reading out, writing and erasing partial regions of said memory, a control unit connected to said memory and to said addressing circuit causing access to part of the memory addresses to be dependent on an input operation through said addressing circuit, said control unit including a data comparison unit carrying out comparison operations between a plurality of stored reference data and externally entered code data, an error register connected to said comparison unit for storing an error if non-agreement is determined between said stored reference data and said externally entered code data, address lines connected to said memory, a selection logic connected to said address lines for determining, according to a predetermined order, said partial quantitites together with said address lines, and an address control unit connected to said address lines through said selection logic for delivering a release signal to said card reader for confirming the validity of said validation data if at least one address was selected from each partial quantity during said comparison operations, and another selection logic connected to said address control unit for determining other partial quantities of address lines as the quantity of intersections with said first-mentioned partial quantities.

14. Circuit according to claim 13, wherein the memory includes code data in code addresses of said other partial quantities which cannot be read out.

15. Mononolithic circuit disposed in a carrier card, being in cooperative engagement with a card reader having a validation data input, comprising a memory having electrically writable and erasable non-volatile storage cells and a memory region having an addressing space subdivided into a plurality of partial quantities of respective addresses receiving reference data; an addresssing circuit connected to said memory for reading out, writing and erasing partial regions of said memory; a control unit connected to said memory and to said addressing circuit causing access to part of the memory addresses to be dependent on an input operation through said addressing circuit, said control unit including a data comparison unit carrying out comparison operations between a plurality of stored reference data and externally entered code data; an error register connected to said comparison unit for storing an error if non-agreement is determined between said stored reference data and said externally entered code data; address lines connected to said memory; a selection logic connected to said address lines for determining, according to a predetermined order, said partial quantities together with said address lines; an address control unit connected to said address lines through said selection logic for delivering a release signal to said card reader for confirming the validity of said validation data if at least one address was selected from each partial quantity during said comparison operations; the error register being connected to an output of said control unit, said error register being set if agreement has not been reached between said stored reference data and said entered code data for inhibitng said release signal; and including a logic unit having an input side connected to the outputs of said error register and said address control unit, and an output side for delivering a second release signal.

16. Monolithic circuit disposed in a carrier card, being in cooperative engagement with a card reader having a validation data input, comprising a memory having electrically writable and erasable non-volatile storage cells and a memory region having an addressing space subdivided into a plurality of partial quantities of respective addresses receiving reference data; an addressing circuit connected to said memory for reading out, writing and erasing partial regions of said memory; a control unit connected to said memory and to said addressing circuit causing access to part of the memory addresses to be dependent on an input operation through said addressing circuit; said control unit including a data comparison unit carrying out comparison operations between a plurality of stored reference data and externally entered code data; and error register connected to said comparision unit for storing an error if non-agreement is determined between said stored reference data and said externally entered code data, address lines connected to said memory; a selection logic connected to said address lines for determining, according to a predetermined order, said partial quantities together with said address lines; an address control unit connected to said address lines through said selection logic for delivering a release signal to said card reader for confirming the validity of said validation data if at least on address was selected from each partial quantity during said comparison operations; the error register being connected to an output of said control unit, said error register being set if agreement has not been reached between said stored reference data and said entered code data for inhibiting said release signal; including another selection logic operatively engaging said address control unit for determining other partial quantities of address lines as the quantity of intersections with said first-mentioned partial quantities; and a data comparision for setting said error register also for addresses outside said other partial quantities.

17. Monolithic circuit according to claim 15 including another selection logic connected to said address control unit for determining other partial quantities of address lines as the quantity of intersections with said first-mentioned partial quantities, and another logic unit connected between said selection logic and said address control unit for blocking the connection of said first-mentioned selection logic to said address control unit when addresses outside said other partial quantities are selected.

* * * * *

UNITED STATES PATENT AND TRADEMARK OFFICE
CERTIFICATE OF CORRECTION

PATENT NO. : 4,712,177

DATED : December 8, 1987

INVENTOR(S) : Hartmut Schrenk

It is certified that error appears in the above-identified patent and that said Letters Patent is hereby corrected as shown below:

In the title page, item (54), and in column 1 title,
"CIRCUIT FOR A CORD CARRIER HAVING A MEMORY . . ."
should read:
"CIRCUIT FOR A CARD CARRIER HAVING A MEMORY . . ."

Signed and Sealed this

Thirteenth Day of December, 1988

Attest:

DONALD J. QUIGG

*Attesting Officer*  *Commissioner of Patents and Trademarks*